United States Patent
Park et al.

(10) Patent No.: US 10,724,514 B2
(45) Date of Patent: Jul. 28, 2020

(54) SYSTEM AND METHOD FOR REMOVING RESIDUAL PRESSURE IN MOTOR DRIVEN AIR COMPRESSOR MANAGEMENT SYSTEM

(71) Applicants: Hyundai Motor Company, Seoul (KR); KIA Motors Corporation, Seoul (KR)

(72) Inventors: Won Ki Park, Jeollabuk-do (KR); Se Joon Lee, Busan (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/202,710

(22) Filed: Nov. 28, 2018

(65) Prior Publication Data

US 2020/0116145 A1    Apr. 16, 2020

(30) Foreign Application Priority Data

Oct. 11, 2018  (KR) .................. 10-2018-0121004

(51) Int. Cl.
*F04B 49/02*    (2006.01)
*F04B 23/02*    (2006.01)
(Continued)

(52) U.S. Cl.
CPC .......... *F04B 49/022* (2013.01); *B60G 17/017* (2013.01); *B60L 1/003* (2013.01); *B60T 13/268* (2013.01); *B60T 17/02* (2013.01); *B60T 17/04* (2013.01); *F04B 23/025* (2013.01); *F04B 37/00* (2013.01); *F04B 37/12* (2013.01); *F04B 49/02* (2013.01); *F04B 49/03* (2013.01); *B60G 2500/205* (2013.01); *B60T 17/004* (2013.01); *F04B 2205/50* (2013.01); *F15B 2211/6309* (2013.01)

(58) Field of Classification Search
CPC ........ F04B 49/022; F04B 49/03; F04B 37/12; F04B 49/02; F04B 23/025; B60T 17/02; B60T 17/004; B60T 13/268; B60T 17/04; B60L 1/003; B60G 17/017; B60G 2500/205; F15B 2211/6309
See application file for complete search history.

(56) References Cited

U.S. PATENT DOCUMENTS

4,052,178 A * 10/1977 Frantz .................. B01D 45/12
96/399
4,541,250 A * 9/1985 Tropeano
(Continued)

*Primary Examiner* — Atif H Chaudry
(74) *Attorney, Agent, or Firm* — Brinks Gilson & Lione (57) ABSTRACT

The present disclosure provides a system and method for removing a residual pressure of compressed air in a motor driven air compressor management system applied to an eco-friendly vehicle. That is, the present disclosure provides a system and a method for removing a residual pressure in a motor driven air compressor management system, which allow a continuous smooth operation of a motor driven air compressor by easily removing a residual pressure of compressed air before a subsequent operation of the motor driven air compressor even though the residual pressure of the compressed air, which fills in an air tank during an operation of the motor driven air compressor, remains according to a tuning off of the motor driven air compressor.

9 Claims, 6 Drawing Sheets

(51) Int. Cl.
*F04B 37/12* (2006.01)
*F04B 37/00* (2006.01)
*F04B 49/03* (2006.01)
*B60T 17/02* (2006.01)
*B60T 17/04* (2006.01)
*B60T 13/26* (2006.01)
*B60L 1/00* (2006.01)
*B60G 17/017* (2006.01)
*B60T 17/00* (2006.01)

(56) References Cited

U.S. PATENT DOCUMENTS

| | | | | |
|---|---|---|---|---|
| 4,685,941 | A * | 8/1987 | Sato | B01D 53/261 96/114 |
| 4,781,209 | A * | 11/1988 | Nelander | B01D 53/261 137/119.05 |
| 6,070,339 | A * | 6/2000 | Cunkelman | |
| 2014/0014201 | A1* | 1/2014 | Minato | |
| 2016/0221447 | A1* | 8/2016 | Urra | |
| 2017/0157558 | A1* | 6/2017 | Sugio | |

* cited by examiner

SYSTEM AND METHOD FOR REMOVING RESIDUAL PRESSURE IN MOTOR DRIVEN AIR COMPRESSOR MANAGEMENT SYSTEM

CROSS-REFERENCE TO RELATED APPLICATION

This application claims priority to and the benefit of Korean Patent Application No. 10-2018-0121004 filed on Oct. 11, 2018, the entire contents of which are incorporated herein by reference.

FIELD

The present disclosure relates to a system and a method of operation for a motor driven air compressor management system.

BACKGROUND

The statements in this section merely provide background information related to the present disclosure and may not constitute prior art.

Since eco-friendly vehicles such as hybrid vehicles and electric vehicles are driven based on electric energy, motor driven air compressors, which are different from conventional mechanical air compressors operating to be interlocked with an engine, are installed on eco-friendly vehicles.

Figure 1:
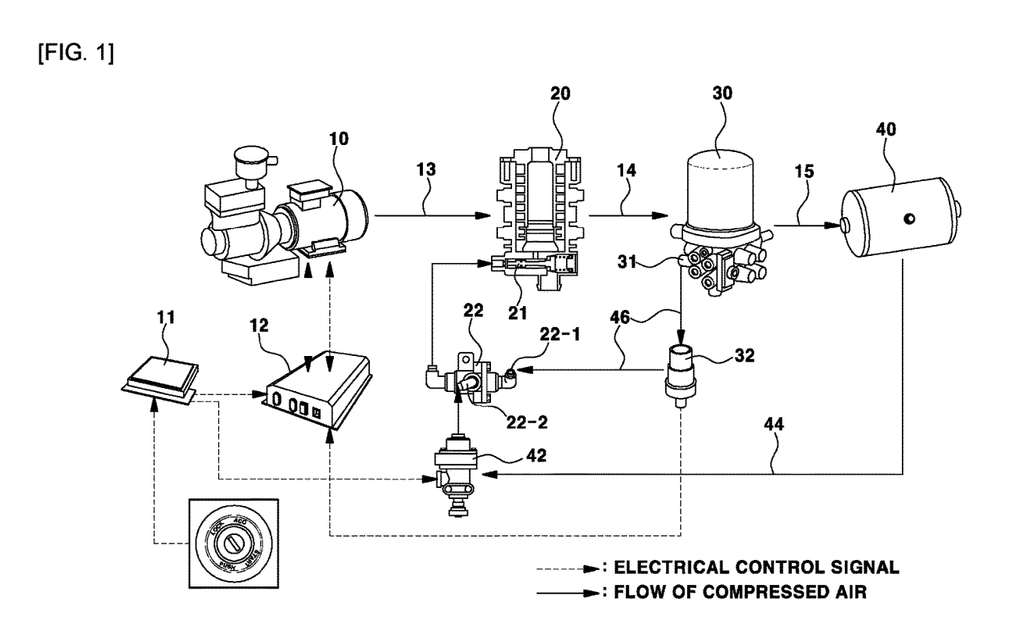
FIG. 1 is a configurational diagram illustrating a conventional motor driven air compressor management system.
Figure 2:
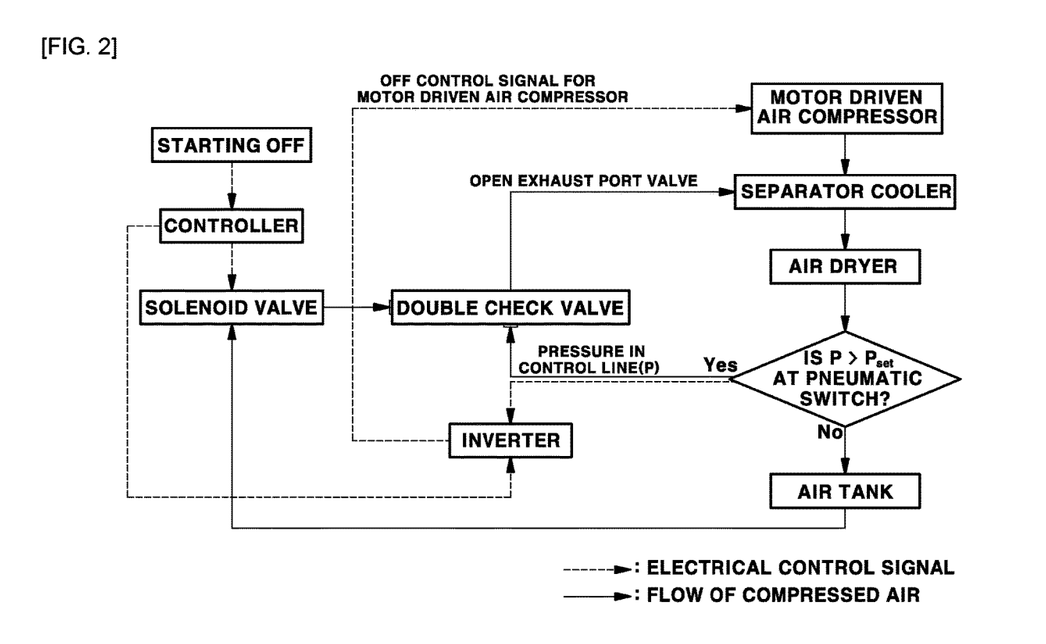
FIG. 2 is a flowchart illustrating an operation of the conventional motor driven air compressor management system.

FIG. 1 is a diagram illustrating an existing, conventional motor driven air compressor management system applied to an electric vehicle, and FIG. 2 is a flowchart illustrating an operation of the existing motor driven air compressor management system.

Generally, a motor driven air compressor 10 generates compressed air which is used in an air brake system of a commercial vehicle, and the generated compressed air is stored in an air tank 40 via a separator cooler 20 and an air dryer 30.

To this end, the motor driven air compressor 10 operates by receiving power of a power through an inverter 12.

That is, when a starting of a vehicle is turned on, a controller 11 of the vehicle applies the power of the battery to the inverter 12, and the inverter 12 performs voltage control on the motor driven air compressor 10 such that an operation of the motor driven air compressor 10 is performed.

Accordingly, the compressed air generated by the operation of the motor driven air compressor 10 fills to be stored in the air tank 40 via the separator cooler 20 and the air dryer 30, and the stored compressed air is used when an air brake is operated.

At this point, the separator cooler 20 primarily removes foreign materials of the compressed air generated in the motor driven air compressor 10 (e.g., an oil component and water which are vaporized as a hydraulic fluid of the motor driven air compressor 10) in a centrifugal separation manner, and simultaneously, the separator cooler 20 serves to cool the generated compressed air because the generated compressed air generated in the motor driven air compressor 10 is in a high temperature state.

Further, the air dryer 30 serves to secondarily remove foreign materials (residual oil, moisture, and the like) of the compressed air flowing from the separator cooler 20 in an absorption manner.

Meanwhile, a double check valve 22 is installed at an exhaust port valve 21 of the separator cooler 20, and a control line 46 to which a maximum filling pressure of the compressed air acts through a purge pot 31 of the air dryer 30 is connected between the purge pot 31 of the air dryer 30 and a first inlet 22-1 of the double check valve 22.

Further, a pneumatic switch 32 which is turned on in an off-load condition of the motor driven air compressor 10 is installed at a control line 46, and an air backflow line 44 at which a solenoid valve 42 is installed is connected between a second inlet 22-2 of the double check valve 22 and the air tank 40.

Figure 3:
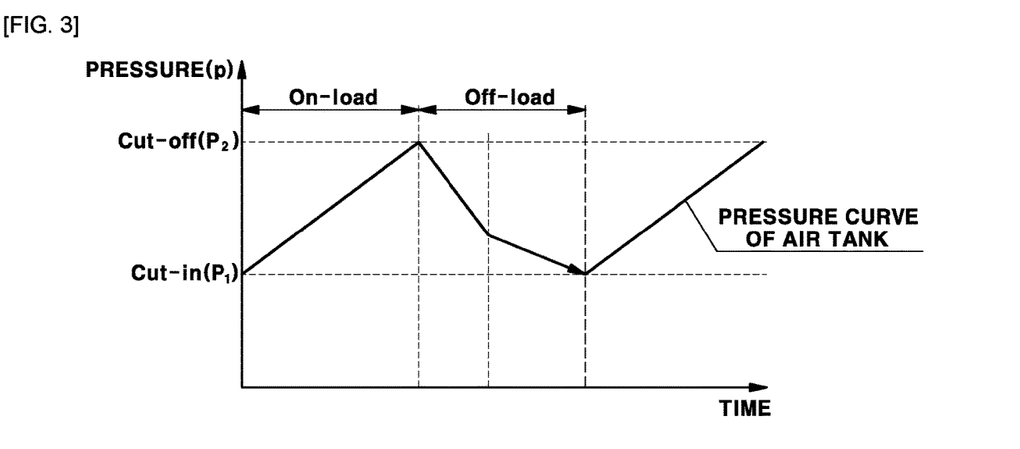
FIG. 3 is a graph showing a pressure variation of an air tank.

FIG. 3 is a graph showing a pressure variation of the air tank 40 of the conventional system.

As shown in FIG. 3, the motor driven air compressor 10 repeats an on-load operation (ON) and off-load operation (OFF) according to set pressures P1 and P2 of the air dryer 30, and in ① section which is an on-load section of the motor driven air compressor 10, a pressure of the air tank 40 is increased by filling the compressed air in the air tank 40, whereas in a ② section which is an off-load section of the motor driven air compressor 10, the a pressure of the air tank 40 is decreased.

In this case, when the compressed air filling in the air tank 40 reaches a maximum filling pressure, the compressed air pressure acting on the control line 46 through the purge pot 31 of the air dryer 30 is referred to as a control line pressure P, and a pressure capable of performing an on-operation by the control line pressure P acting on the control line 46 is referred to as a pneumatic switch operating pressure $P_{set}$.

In an operation condition of the motor driven air compressor 10 (control line pressure P<pneumatic switch operating pressure $P_{set}$), the compressed air generated by an operation of the motor driven air compressor 10 fills in the air tank 40 via the separator cooler 20 and the air dryer 30.

Meanwhile, in an off-load condition of the motor-driven air compressor 10 (control line pressure P>pneumatic switch operating pressure $P_{set}$), the pneumatic switch 32 is turned on by a pressure of the control line 46 and, simultaneously, an on-operation signal is transmitted to the inverter 12, the inverter 12 receiving the on-operation signal of the pneumatic switch 32 interrupts an operation of the motor driven air compressor 10, and the control line pressure P acting on the control line 46 passes through the first inlet 22-1 of the double check valve 22 and is exhausted to the outside through the exhaust port valve 21 of the separator cooler 20.

In this case, when the control line pressure P does not act, the exhaust port valve 21 of the separator cooler 20 is closed, and when the control line pressure P acts, the exhaust port valve 21 is opened to communicate with the atmosphere.

Thus, after the control line pressure P passes through the first inlet 22-1 of the double check valve 22 while turning the pneumatic switch 32 on, the control line pressure P acts on the exhaust port valve 21 such that the exhaust port valve 21 is opened and the control line pressure P is exhausted to the outside.

Further, in the off-load condition of the motor-driven air compressor 10, the controller 11 controls the solenoid valve 42, which is installed at the air backflow line 44 to be selectively opened.

Accordingly, some portion of the compressed air filling in the air tank 40 passes through the solenoid valve 42 of the air backflow line 44, passes through the second inlet 22-2 of the double check valve 22, and then is exhausted to the outside through the exhaust port valve 21 of the separator cooler 20, and at this point, some portion of the compressed air from the air tank 40 acts on the exhaust port valve 21 and the exhaust port valve 21 is opened by a pressure of the compressed air such that foreign materials (e.g., an oil component vaporized as a hydraulic fluid of the motor-driven air compressor 10, moisture, and the like) may be discharged and removed by some portion of the compressed air exhausted through the exhaust port valve 21.

Meanwhile, as described above, while the motor driven air compressor 10 operates in the operating condition of the motor driven air compressor 10 (the control line pressure P<pneumatic switch operating pressure $P_{set}$) and the compressed air fills in the air tank 40, there may occur a case in which a starting of the vehicle is factitiously turned off such that the motor driven air compressor 10 is turned off, or the motor driven air compressor 10 is turned off by a cause of an abnormal operation (e.g., overheating of a motor of the motor driven air compressor 10, and the like).

When the motor driven air compressor 10 is turned off during driving, a residual pressures is present in the air filling line 13 connected between the motor driven air compressor 10 and the separator cooler 20, and in the air filling line 14 connected between the separator cooler 20 and the air dryer 30.

Thereafter, when the motor driven air compressor 10 operates again, an electrical load on the motor of the motor driven air compressor 10 by the residual pressure which is present in the air filling lines 13 and 14 may cause the motor driven air compressor 10 to not operate.

As described above, when a pressure of air, which fills in the air tank 40 by an operation of the motor driven air compressor 10, reaches a maximum pressure, a pressure is generated in the control line 46. At this point, when the control line pressure P acting on the control line 46 is equal to or greater than the pneumatic switch operating pressure $P_{set}$, the pneumatic switch 32 is turned on.

Subsequently, the pneumatic switch 32 is turned on and, simultaneously, the on-operation signal is transmitted to the inverter 12, the inverter 12 receiving the on-operation signal for the pneumatic switch 32 interrupt the operation of the motor driven air compressor 10, and the control line pressure P acting on the control line 46 passes through the first inlet 22-1 of the double check valve 22 and is exhausted to the outside through the exhaust port valve 21 of the separator cooler 20.

As described above, together with the interruption of an operation of the motor of the motor driven air compressor 10, the control line pressure P applied to the control line 46 is exhausted through the exhaust port valve 21 of the separator cooler 20, i.e., a so-called residual pressure removal is performed, but when the control line pressure P is less than the pneumatic switch operating pressure $P_{set}$, a residual pressure remains in the air filling lines 13 and 14.

A phenomenon we have discovered in which the residual pressure remains in the air filling lines 13 and 14 will be described in detail below with reference to FIG. 4.

Figure 4:
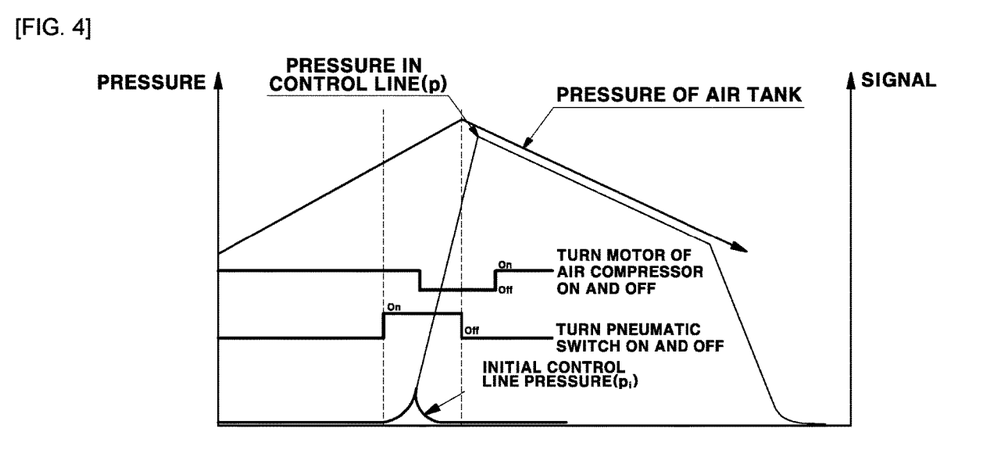
FIG. 4 is a graph showing ON and OFF periods of a pneumatic switch, ON and OFF periods of a motor of a motor driven air compressor, and pressure variations of the air tank and a control line.

FIG. 4 illustrates ON and OFF periods of the pneumatic switch 32 of the conventional system, ON and OFF periods of the motor of the motor driven air compressor 10, and pressure variations of the air tank 40 and the control line 46.

While the motor driven air compressor 10 operates and compressed air fills in the air tank 40 as described above, when there occurs a situation in which the motor driven air compressor 10 is turned off manually or the motor driven air compressor 10 is turned off due to an abnormal operation cause (e.g., overheating of the motor of the motor driven air compressor 10), as indicated by a bold line and an initial control line pressure Pi in FIG. 4, a pressure acting on the control line 46 does not rise to the control line pressure P which is a maximum pressure capable of turning the pneumatic switch 32 on and rises to a certain level to finally drop such that a residual pressure of the compressed air corresponding to the initial control line pressure Pi remains in the air filling lines 13 and 14.

As described above, while the motor driven air compressor 10 operates and the compressed air fills in the air tank 40, when there occurs a situation in which the motor driven air compressor 10 is turned off manually or due to an abnormal operation cause, the residual pressure of the compressed air remains directly in the air filling line 13 connected between the motor driven air compressor 10 and the separator cooler 20, and in the air filling line 14 connected between the separator cooler 20 and the air dryer 30.

Thus, when a starting of the motor driven air compressor 10 is turned on again in a state in which the residual pressure remains in the air filling lines 13 and 14, an electric load is increased to the motor of the motor driven air compressor 10 due to the residual pressure such that there may be a situation in which an initial operation of the motor driven air compressor 10 is not smoothly performed.

The above information disclosed in this Background section is only for enhancement of understanding of the background and therefore it may contain information that does not form the prior art that is already known to a person of ordinary skill in the art.

SUMMARY OF THE DISCLOSURE

In one aspect, the present disclosure provides a system and a method for removing a residual pressure in a motor driven air compressor management system, which allow a continuous smooth operation of a motor driven air compressor by easily removing a residual pressure of compressed air before a subsequent operation of the motor driven air compressor even though the residual pressure of the compressed air, which fills in an air tank during an operation of the motor driven air compressor, remains according to a tuning off of the motor driven air compressor.

In an aspect, a system for removing a residual pressure in a motor driven air compressor management system may include a motor driven air compressor, a separator cooler configured to primarily remove foreign materials of compressed air generated by the motor driven air compressor, an air dryer configured to secondarily remove foreign materials of the compressed air flowing from the separator cooler, an air tank in which the compressed air fills to be stored, an inverter configured to perform ON/OFF control of the motor driven air compressor, and a control line connected to a purge port of the air dryer and on which a filling pressure of the compressed air act, wherein a pneumatic switch which may be turned on by a maximum filling pressure of the compressed air is installed at the control line, an air backflow line may be directly connected between the air tank and an exhaust port valve of the separator cooler, and a solenoid valve which may be turned on by a control signal of a controller is installed at the air backflow line.

In another aspect, a method for removing a residual pressure in a motor driven air compressor management system may include turning a motor driven air compressor on, while the motor driven air compressor operates, detecting, by a controller, the motor driven air compressor is turned off in a state in which a control line pressure P is less than a pneumatic switch operating pressure $P_{set}$, controlling, by the controller, a solenoid valve installed at an air backflow line, which connects an air tank to an exhaust port valve of a separator cooler, to be turned on, and allowing some portion of the compressed air filling in the air tank to flow along the air backflow line and, simultaneously, to pass through the solenoid valve, thereby acting some portion of the compressed air as a pressure on the exhaust port valve of the separator cooler and opening the exhaust port valve of the separator cooler.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

It should be understood that the appended drawings are not necessarily to scale, presenting a somewhat simplified representation of various features illustrative of the basic principles of the disclosure. The specific design features as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 5:
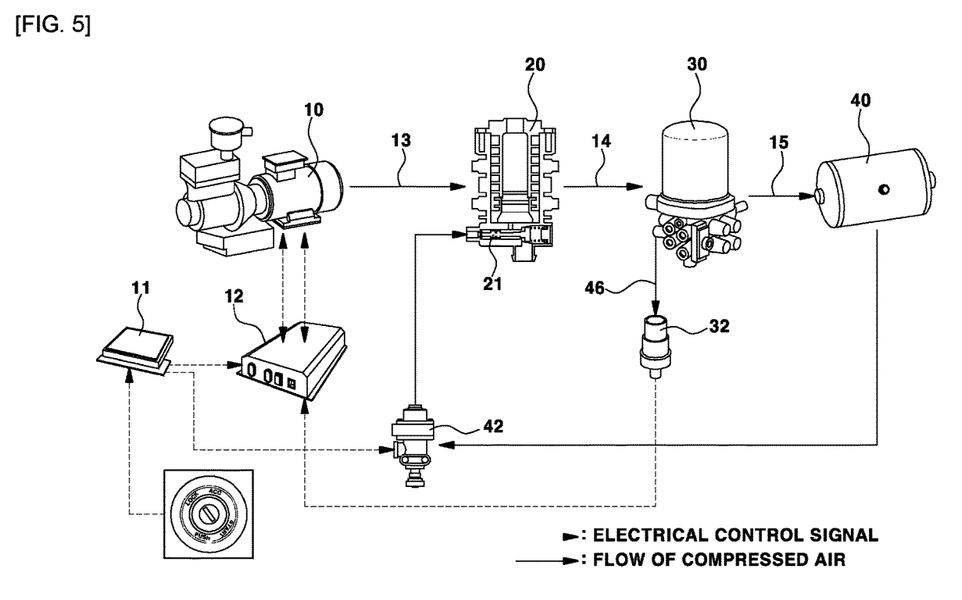
FIG. 5 is a configurational diagram illustrating a system for removing a residual pressure in a motor driven air compressor management system.
Figure 6:
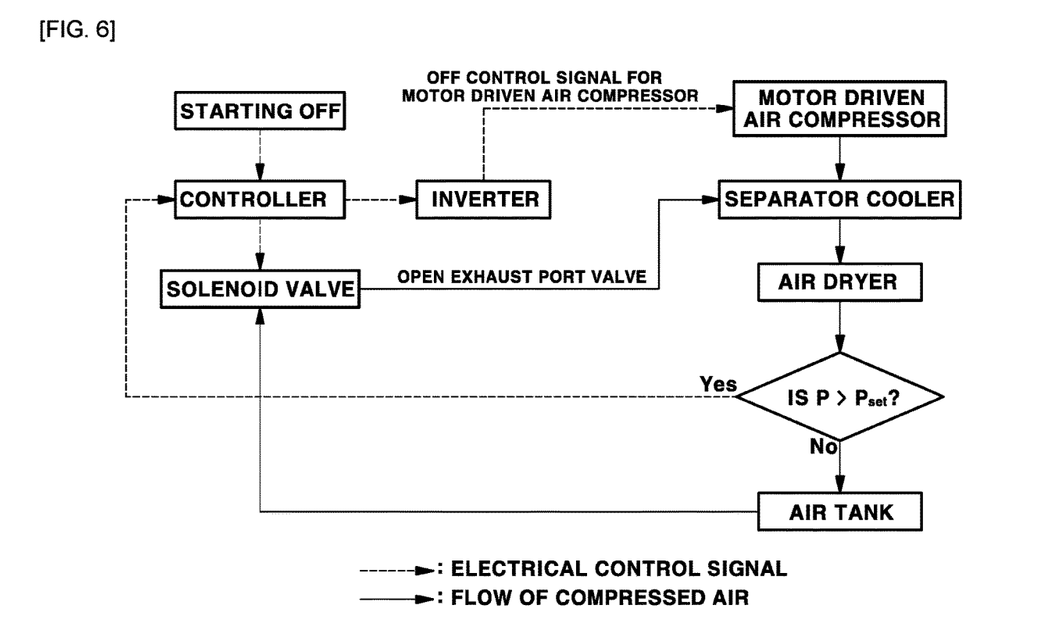
FIG. 6 is a flowchart illustrating an operation of the system for removing a residual pressure in motor driven air compressor management system.

FIG. 5 is a configurational diagram illustrating a system for removing a residual pressure in a motor driven air compressor management system according to the present disclosure, and FIG. 6 is a flowchart illustrating an operation of the system for removing a residual pressure in motor driven air compressor management system according to the present disclosure.

A system for removing a residual pressure in a motor driven air compressor management system according to the present disclosure includes a motor driven air compressor 10 for generating compressed air used in an air brake system of a commercial vehicle, a separator cooler 20 for primarily removing foreign materials (e.g., an oil component evaporated as a hydraulic fluid of the motor driven air compressor 10, moisture, and the like) and for cooling the compressed air because the compressed air generated by the motor driven air compressor 10 is in a high temperature state, an air dryer 30 for secondarily removing the foreign materials (such as residual oil and moisture) of the compressed air flowing from the separator cooler 20 in an adsorption manner, and an air tank 40 in which the compressed air fills to be stored.

In this case, an air filling line 13 is connected between the motor driven air compressor 10 and the separator cooler 20, an air filling line 14 is connected between the separator cooler 20 and the air dryer 30, and an air filling line 15 is connected between the air dryer 30 and the air tank 40.

The motor driven air compressor 10 operates by receiving power of a power through an inverter 12.

That is, when a starting of a vehicle is turned on and a controller 11 of the vehicle applies the power of the battery to the inverter 12, the inverter 12 performs voltage control on the motor driven air compressor 10 such that an operation of the motor driven air compressor 10 is performed.

Accordingly, the compressed air generated by the operation of the motor driven air compressor 10 fills to be stored in the air tank 40 by sequentially passing through the air filling line 13, the separator cooler 20, the air filling line 14, the air dryer 30, and the air filling line 15, and the stored compressed air is used for an operation of an air brake applied to an eco-friendly vehicle and the like.

Meanwhile, a control line 46 on which a maximum filling pressure of the compressed air acts is connected to a purge pot 31 of the air dryer 30, and a pneumatic switch 32 which is turned on in an off-load condition of the motor driven air compressor 10 is installed at the control line 46.

Further, an air backflow line 44 at which a solenoid valve 42 is installed is directly connected between the air tank 40 and the exhaust port valve 21 of the separator cooler 20.

More specifically, the air backflow line 44 is directly connected between the air tank 40 and the exhaust port valve 21 of the separator cooler 20, and the solenoid valve 42 which is turned on according to a control signal of the controller 11 is installed at the air backflow line 44.

An operation flow and a process of residual pressure control of the motor driven air compressor management system according to the present disclosure will be described below with reference to FIGS. 5 and 6 and Table 1.

TABLE 1

| Operation Mode | Pneumatic Switch | Solenoid Valve | Exhaust Port Valve of Separator Cooler |
|---|---|---|---|
| During Vehicle Driving (ON state of | Off On | Off On | Close Open |

TABLE 1-continued

| Operation Mode | Pneumatic Switch | Solenoid Valve | Exhaust Port Valve of Separator Cooler |
|---|---|---|---|
| starting) | | | |
| Starting ON ↓ | Off | Off → On → Off | Close → Open → Close |
| Starting OFF | On | On | Open |

As described above, when the controller 11 of a vehicle applies the power of the battery to the inverter 12 while a starting of the vehicle is turned on, the inverter 12 performs voltage control on the motor driven air compressor 10 and thus the motor driven air compressor 10 is turned on to operate, and the compressed air generated by the operation of the motor driven air compressor 10 fills to be stored in the air tank 40 by sequentially passing through the air filling line 13, the separator cooler 20, the air filling line 14, the air dryer 30, and the air filling line 15.

Thus, in an operation condition of the motor driven air compressor 10 (control line pressure P<pneumatic switch operating pressure $P_{set}$), the compressed air generated by the motor driven air compressor 10 fills in the air tank 40 by passing through the separator cooler 20 and the air dryer 30, and at this point, the pneumatic switch 32 and the solenoid valve 42 are kept in an off state, and the exhaust port valve 21 of the separator cooler 20 is kept in a closed state.

On the other hand, in an off-load condition of the motor driven air compressor 10 (control line pressure P>pneumatic switch operating pressure $P_{set}$), the pneumatic switch 32 is turned on by the control line pressure P and, simultaneously, the on-operation signal is transmitted to the controller 11, the controller 11 receiving the on-operation signal for the pneumatic switch 32 transmits a command for interrupting the operation of the motor driven air compressor 10 to the inverter 12, the inverter 12 turns the motor driven air compressor 10 off to interrupt the operation thereof, the controller 11 turns the solenoid valve 42 on, and some portion of the compressed air filling in the air tank 40 passes through the solenoid valve 42 of the air backflow line 44 and then acts on the exhaust port valve 21 of the separator cooler 20 to open the exhaust port valve 21.

At this point, when the exhaust port valve 21 of the separator cooler 20 is opened, the air filling line 13 connected between the motor driven air compressor 10 and the separator cooler 20 and the air filling line 14 connected between the separator cooler 20 and the air dryer 30 become in a state of communicating with the atmosphere through the exhaust port valve 21.

Thus, a residual pressure of the compressed air, which remains in the air filling line 13 connected between the motor driven air compressor 10 and the separator cooler 20 and the air filling line 14 connected between the separator cooler 20 and the air dryer 30, may be exhausted to the outside through the exhaust port valve 21.

However, as described above, when the motor driven air compressor 10 is turned off manually or is turned off due to an abnormal operation cause in the operation condition (control line pressure P<pneumatic switch operating pressure $P_{set}$ instead that the operation of the motor driven air compressor 10 is interrupted by OFF control of the inverter 12 in the off-load condition (control line pressure P>pneumatic switch operating pressure $P_{set}$), the residual pressure of the compressed air remains in the air filling line 13 connected between the motor driven air compressor 10 and the separator cooler 20, and in the air filling line 14 connected between the separator cooler 20 and the air dryer 30.

Thereafter, when the motor driven air compressor 10 operates again, an electrical load on the motor of the motor driven air compressor 10 by the residual pressure which is present in the air filling lines 13 and 14 such that there may be a situation in which that the motor driven air compressor 10 does not operate smoothly.

Accordingly, the present disclosure is provided to easily remove the residual pressure of the compressed air before a subsequent operation (ON) of the motor driven air compressor 10 to allow the motor driven air compressor 10 to smoothly operate at all times.

To this end, as described above, only the pneumatic switch 32 is installed at the control line 46 connected to the purge pot 31 of the air dryer 30, and specifically, the air backflow line 44 at which the solenoid valve 42 is installed is directly connected between the air tank 40 and the exhaust port valve 21 of the separator cooler 20.

Therefore, while the motor driven air compressor 10 operates in the operation condition (control line pressure P<pneumatic switch operating pressure $P_{set}$), when there occurs a situation in which the motor-driven air compressor 10 is turned off by a manual tuning off the starting of the vehicle or is turned off due to an abnormal operation cause (e.g., overheating of the motor of the motor driven air compressor 10), the solenoid valve 42 is temporarily turned on for a predetermined period of time by a control signal of the controller 11.

That is, in a state in which the controller 11 detects that the control line pressure P is less than the pneumatic switch operating pressure $P_{set}$ while the motor driven air compressor 10 operates, when the motor driven air compressor 10 is turned off, the controller 11 controls the solenoid valve 42 to be temporarily turned on for a predetermined period of time.

Then, in an OFF state, the solenoid valve 42 is temporarily turned on for the predetermined period of time by the control signal of the controller 11 and then is turned off again (see a fourth column in Table 1).

At this point, when the solenoid valve 42 is temporarily turned on, some portion of the compressed air filling in the air tank 40 flows along the air backflow line 44 and, simultaneously, passes through the solenoid valve 42 to act as a pressure on the exhaust port valve 21 of the separator cooler 20 such that the exhaust port valve 21 becomes in an opened state.

Meanwhile, when the exhaust port valve 21 of the separator cooler 20 is opened, the air filling line 13 connected between the motor driven air compressor 10 and the separator cooler 20 and the air filling line 14 connected between the separator cooler 20 and the air dryer 30 become in a state of communicating with the atmosphere through the exhaust port valve 21.

Thus, a residual pressure of the compressed air, which remains in the air filling line 13 connected between the motor driven air compressor 10 and the separator cooler 20 and the air filling line 14 connected between the separator cooler 20 and the air dryer 30, may be exhausted to the outside through the exhaust port valve 21.

Consequently, when the solenoid valve 42 is turned off, since the pressure of the compressed air from the air tank 40 does no act on the exhaust port valve 21, the exhaust port valve 21s closed with the turning off of the solenoid valve 42.

Thus, the residual pressure of the compressed air existing in the air filling lines 13 and 14 is removed such that, even though the motor driven air compressor 10 operates again, the electric load on the motor included in the motor driven air compressor 10 is not increased and thus the motor driven air compressor 10 may smoothly operate at all times.

As described above, while the motor driven air compressor operates, even though the motor driven air compressor is turned off manually due to a turning off of the starting of the vehicle or is turned off abnormally and thus the residual pressure of the compressed air remains in the air filling line, the residual pressure of the compressed air is easily removed before a subsequent operation of the motor driven air compressor such that the motor driven air compressor may smoothly operate at all times.

First, while an air compressor operates, even though the air compressor is turned off manually due to a turning off of the starting of the vehicle or is turned off abnormally and thus a residual pressure of compressed air remains in an air filling line, the residual pressure of the compressed air is easily removed before a subsequent operation of the air compressor such that the air compressor can smoothly operate at all times.

Second, it is possible to inhibit or prevent a phenomenon in which a motor included in the air compressor is overheated by overload due to the residual pressure remaining in the air filling line.

Third, it is possible to reduce the number of parts and production cost by eliminating a double check valve included in an existing motor driven air compressor management system.

The scope of the disclosure is not limited to this description, and various modifications and improvements devised by those skilled in the art using the fundamental concept of the present disclosure further fall within the scope of the present disclosure.

What is claimed is:

1. A system for removing a residual pressure in a motor driven air compressor management system, comprising:
    a motor driven air compressor;
    a separator cooler configured to primarily remove foreign materials of compressed air generated by the motor driven air compressor;
    an air dryer configured to secondarily remove foreign materials of the compressed air flowing from the separator cooler;
    an air tank in which the compressed air fills to be stored;
    an inverter configured to perform ON/OFF control of the motor driven air compressor; and
    a control line connected to a purge port of the air dryer and on which a filling pressure of the compressed air acts,
    wherein:
        a pneumatic switch which is turned on by a maximum filling pressure of the compressed air is installed at the control line;
        an air backflow line is directly connected to the air tank and an exhaust port valve of the separator cooler, and some portion of the compressed air filling in the air tank flows along the air backflow line to the exhaust port valve of the separator cooler; and
        a solenoid valve which is turned on by a control signal of a controller is installed at the air backflow line.

2. The system of claim 1, wherein, when the motor driven air compressor is turned off in a state in which a control line pressure P is less than a pneumatic switch operating pressure $P_{set}$ while the motor driven air compressor is turned on, the solenoid valve is temporarily turned on for a predetermined period of time by the control signal of the controller.

3. The system of claim 2, wherein, when the solenoid valve is temporarily turned on, the some portion of the compressed air filling in the air tank flows along the air backflow line and, simultaneously, passes through the solenoid valve to act as a pressure on the exhaust port valve of the separator cooler such that the exhaust port valve of the separator cooler is opened.

4. The system of claim 3, wherein, when the exhaust port valve is opened, a residual pressure of the compressed air remaining in an air filling line connected between the motor driven air compressor and the separator cooler and in an air filling line connected between the separator cooler and the air dryer are exhausted to the outside through the exhaust port valve.

5. A method for removing a residual pressure in a motor driven air compressor management system, comprising:
    turning a motor driven air compressor on;
    while the motor driven air compressor operates, detecting, by a controller, the motor driven air compressor is turned off in a state in which a control line pressure P is less than a pneumatic switch operating pressure $P_{set}$;
    controlling, by the controller, a solenoid valve installed at an air backflow line, which connects an air tank to an exhaust port valve of a separator cooler, to be turned on; and
    allowing some portion of the compressed air filling in the air tank to flow along the air backflow line and, simultaneously, to pass through the solenoid valve, thereby acting some portion of the compressed air as a pressure on the exhaust port valve of the separator cooler and opening the exhaust port valve of the separator cooler.

6. The method of claim 5, further comprising:
    when the exhaust port valve is opened, exhausting a residual pressure of the compressed air remaining in an air filling line connected between the motor driven air compressor and the separator cooler and in an air filling line connected between the separator cooler and an air dryer to the outside through the exhaust port valve.

7. The method of claim 5, further comprising:
    temporarily turning a solenoid valve for a predetermined period of time according to a control signal of the controller and turning the solenoid valve off again.

8. The method of claim 7, further comprising:
    when the solenoid valve is turned off again after being turned on, releasing a pressure of the compressed air acting on the exhaust port valve of the separator cooler and closing the exhaust port valve.

9. A system for removing a residual pressure in a motor driven air compressor management system, comprising:
    a motor driven air compressor;
    a separator cooler configured to primarily remove foreign materials of compressed air generated by the motor driven air compressor;
    an air dryer configured to secondarily remove foreign materials of the compressed air flowing from the separator cooler;
    an air tank in which the compressed air fills to be stored;
    an inverter configured to perform ON/OFF control of the motor driven air compressor; and
    a control line connected to a purge port of the air dryer and on which a filling pressure of the compressed air act,
    wherein a pneumatic switch which is turned on by a maximum filling pressure of the compressed air is installed at the control line;
    an air backflow line is directly connected to the air tank and an exhaust port valve of the separator cooler;

a solenoid valve which is turned on by a control signal of a controller is installed at the air backflow line; and a controller configured to:
- while the motor driven air compressor operates, detect the motor driven air compressor is turned off in a state in which a control line pressure P is less than a pneumatic switch operating pressure $P_{set}$, and
- allow some portion of the compressed air filling in the air tank to flow along the air backflow line and, simultaneously, to pass through the solenoid valve, thereby acting some portion of the compressed air as a pressure on the exhaust port valve of the separator cooler and opening the exhaust port valve of the separator cooler.

\* \* \* \* \*